United States Patent [19]

Saito

[11] Patent Number: 4,751,544

[45] Date of Patent: Jun. 14, 1988

[54] DIAPHRAGM DRIVE METHOD

[75] Inventor: Syuichiro Saito, Yokohama, Japan

[73] Assignee: Canon Kabushiki Kaisha, Tokyo, Japan

[21] Appl. No.: 915,022

[22] Filed: Oct. 3, 1986

[30] Foreign Application Priority Data

Oct. 8, 1985 [JP] Japan ................... 60-224499

[51] Int. Cl.$^4$ ............................................. G03B 7/095
[52] U.S. Cl. ............................................... 354/452
[58] Field of Search ............... 354/446, 448, 451, 452, 354/453, 271.1, 274

[56] References Cited

U.S. PATENT DOCUMENTS

| 4,104,656 | 8/1978 | Strauss | 354/451 |
| 4,299,459 | 11/1981 | Mizokami | 354/452 |
| 4,615,600 | 10/1986 | Nakajima | 354/451 |

Primary Examiner—W. B. Perkey
Attorney, Agent, or Firm—Robin, Blecker & Daley

[57] ABSTRACT

A diaphragm device having a plurality of blades defining an aperture opening whose size is varied by a stepwise drive. For the adjustment of the size to small values, the driving of the diaphragm blades is controlled in such a manner that they are first driven excessively by at least one step and then backward by the corresponding number of steps to that excess.

12 Claims, 3 Drawing Sheets

DIAPHRAGM DRIVE METHOD

BACKGROUND OF THE INVENTION

1. Field of the Invention

This invention relates to diaphragm devices for cameras, and more particularly to a diaphragm drive method in the diaphragm device with a stepping motor as the drive source for driving the plurality of blades stepwise to vary the size of aperture opening.

2. Description of the Related Art

The diaphragm device in which the plurality of blades are driven by the stepping motor as the drive source to adjust the diameter of aperture opening are advantageous in many respects. For example, the structure is simple and the control is also easy, because the number of driven steps of the stepping motor can be related directly to the number of stops of the diaphragm.

By the way, in general, in the diaphragm device having the plurality of blades (for example, 5 to 6 blades), as the diameter of the aperture opening decreases, the overlapped area of each blade on the adjacent two ones increases. Therefore, the friction of all the blades is much increased, causing the mechanical error to be one-sided. As a result, the accurate adjustment tends to become difficult. For example, when the diaphragm blades move in a direction from a relatively large diameter of the aperture opening to smaller diameters, it will happen that the resultant diameter of the aperture opening is slightly larger than the aimed one because of the one-sidedness of the mechanical tolerance due to the aforesaid increase of the friction occurs. Conversely in the region of smaller diameters of the aperture opening, when the change of the diameter from the presently given value to a slightly larger one is carried out, the resultant diameter will be slightly smaller than the aimed one.

Such an error in the adjustment of the diameter of the aperture opening, if taking place in the region of larger diameters, does not give rise to a very serious problem, for the rate of error is small. In the region of smaller diameters, on the other hand, since this rate becomes large, it becomes serious on the point of view of assuring a correct exposure.

SUMMARY OF THE INVENTION

It is, therefore, an object of the invention to provide a diaphragm drive method for use in the diaphragm device where the diameter of an aperture opening defined by a plurality of diaphragm blades is varied by driving them stepwise, whereby the error of adjustment which will occur particularly in the region of smaller diameters of the aperture opening is as well eliminated as possible, to enable an improved accuracy of adjustment to be achieved.

To accomplish this object, in an embodiment of the invention, when the diameter of the aperture opening is adjusted to a small value as changed from a relatively large value, after the aimed value is reached, the diaphragm blades are further driven in the same direction to the excess of at least one step, and then in the reversed direction by the corresponding number of steps to that excess, or are opened wider by that number, and stopped.

Thus, in the diaphragm drive method of the above-described embodiment, the driving of the diaphragm blades in the region of small diameters of the aperture opening is controlled in such a manner that after the diaphragm blades are driven excessively by at least one step, they are driven backward by the corresponding number of steps to that excess, thereby giving an advantage that, in application to the diaphragm device having a plurality of blades with their aperture opening being varied stepwise, the loss in the accuracy of adjustment which would otherwise often result in the region of small diameters of the aperture opening can be almost perfectly prevented.

DETAILED DESCRIPTION OF THE PREFERRED EMBODIMENT

Figure 1:
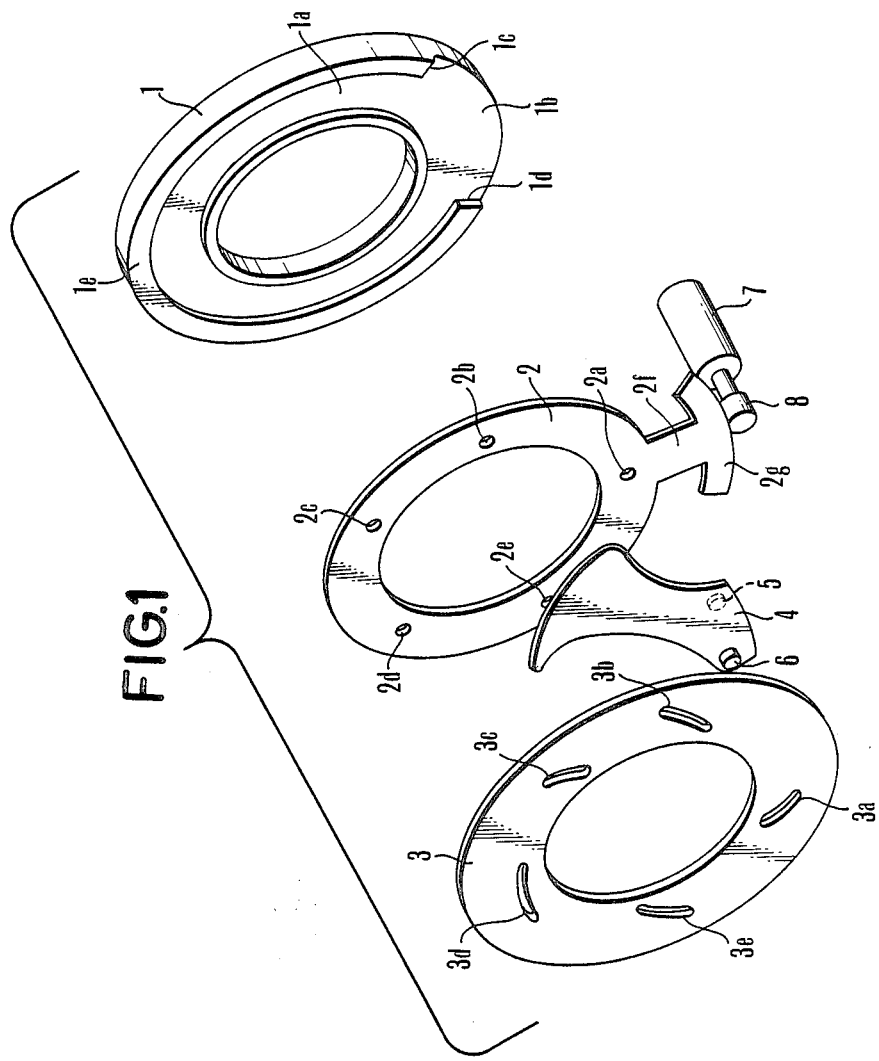
FIG. 1 is an exploded perspective view of an example of the diaphragm device to which the present invention is applicable.

The present invention is next described in connection with an embodiment thereof by reference to the accompanying drawings. In FIG. 1, the diaphragm device comprises a ring-shaped diaphragm base plate 1 having one surface in which a ring-shaped recess 1a is formed with a sector portion 1b opened so that an annular extension 1e has a cutout, a drive ring 2 rotatably fitted in the recess 1a of the base plate 1, and having five holes 2a to 2e in equally spaced relation, and having a lever portion 2f arranged in the sector portion 1b of the recess 1a and formed with a sector gear 2g, both ends 1c and 1d of the extension 1e serving as stoppers for the lever portion 2f, and a cam ring 3 having five arcuate cam slots 3a to 3e. Five diaphragm blades, only one of which is shown here at 4, each has two pins 5 and 6 fixedly secured thereto. The pin 5 is rotatably fitted in the hole 2a of the ring 2, and the pin 6 engages in the camming slot 3a. For note, this arrangement is the same even for the other four blades. For this purpose, the holes 2b to 2e of the ring 2 and the camming slots 3b to 3e of the ring 3 are used. A stepping motor 7 as the drive source has an output shaft on which a pinion 8 is mounted. The pinion 8 meshes with the sector gear 2g of the ring 2.

As the current supply to the stepping motor 7 is controlled, when its output shaft rotates in a clockwise direction as viewed in FIG. 1, the drive ring 2 rotates in a counterclockwise direction through the pinion gear 8 and the sector gear 2g. Thereby, the pin 5 is driven in the clockwise direction. By the action of the pin 6 and the camming slot 3b, the blade 4 is turned about the pin 5 in the counterclockwise direction with decreasing diameters of the aperture opening of the diaphragm.

Conversely when the stepping motor 7 rotates in the counterclockwise direction, the diaphragm device operates in just the opposite manner to that described above, increasing its diameter of aperture opening.

Figure 2:
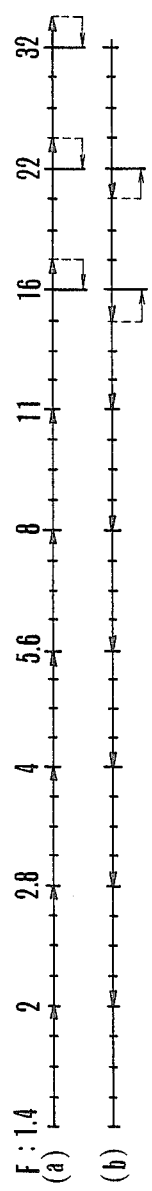
FIG. 2 is a schematic diagram illustrating the manner in which the diaphragm device of FIG. 1 with the drive control means of the invention operates.

An embodiment of the drive method according to the invention applied to the above-described diaphragm device will be explained by reference to FIG. 2.

In this embodiment, the maximum and minimum possible aperture values are assumed to be F/1.4 and F/32 respectively, and the number of steps the stepping motor 7 rotates for one stop of the diaphragm to be 4.

For example, for a change of the aperture value from F/1.4 to F/2, the stepping motor 7 is made to rotate four steps in the clockwise direction. For another example of change from F/1.4 to F/11, the necessary number of steps is increased to 24.

By the way, as has been described, as the diameter of the aperture opening lies in a region of small values, the friction between the adjacent two blades is, because of the large overlapped area, so great that the tolerances of the sizes of the pins 5 and the holes 2a to 2e and those of the pins 6 and the camming slots 3a to 3e are one-sided in summing up. This leads to production of an error of the actually adjusted diameter of the aperture opening from that at which the adjustment is aimed.

For example, when the diaphragm is closed down, a slightly larger diameter of the aperture opening than the target one will be set. Also, when the changed number of stops from the minimum aperture value is small, the setting of a slightly smaller diameter of the aperture opening will result. And, as such an error takes place in the region of small diameters of the aperture opening, the proportion of the difference between the actual and ideal aperture values to the absolute aperture value is very large, giving rise to a very serious problem for obtaining a correct exposure.

On this account, in the embodiment of the invention, when the diaphragm is adjusted in a region of F/16 to F/32, the stepping motor 7 is made excessively driven by one step over the target aperture value, and then backward by the corresponding number of steps to that excess, in this instance, by one step. That is, as shown on line (a) in FIG. 2, when adjustment is carried out from, for example, F/1.4 to F/16, F/22 or F/32, the stepping motor 7 has, despite the required number of steps is respectively 28, 32 or 36, to be driven to rotate 29, 33 or 37 steps, since the excess is one step, and then to be driven to rotate one step backward. Also, when from F/32 to F/22 or F/16, as shown on line (b) in FIG. 2, despite the required number of steps is 4 or 8 respectively, the stepping motor 7 is driven to rotate excessively by one step, in total, 5 or 9 steps respectively, and then to return by one step.

The employment of such a drive method provides a possibility of correcting the one-sidedness of the mechanical tolerances in adjusting the diameter of the aperture opening, and achievement of a great improvement of the difference between the actual and ideal aperture values to be set.

Figure 3:
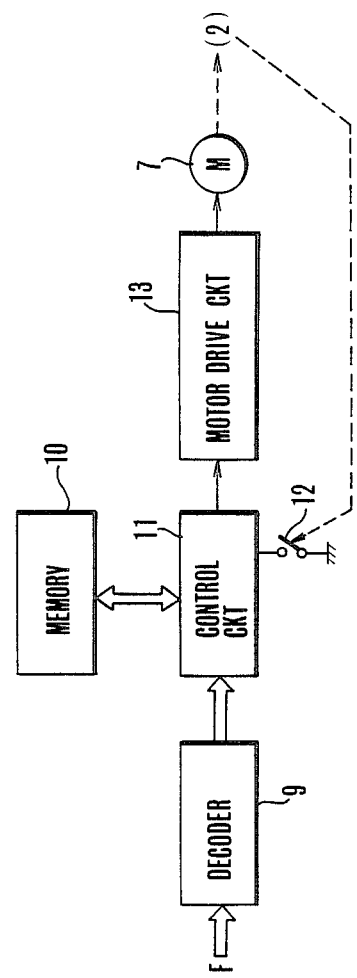
FIG. 3 is a block diagram illustrating an example of a circuit system for performing the drive method described in connection with FIG. 2.

FIG. 3 shows an example of the circuit system that enables the drive method of the character described above to be realized. The system comprises a decoder 9 for converting the aperture value F to a number of drive steps (namely, the number of stops multiplied by 4) of the stepping motor 7, a memory 10 for memorizing the concurrent aperture value in the form of the number of steps of the stepping motor 7, a diaphragm control circuit 11 for controlling the diameter of the aperture opening in accordance with the combination of the outputs of the decoder 9 and the memory 10, a switch 12 arranged to turn on when the diaphragm is fully opened, and a motor drive circuit 13 for driving the stepping motor 7 on the basis of the output of the control circuit 11.

Figure 4:
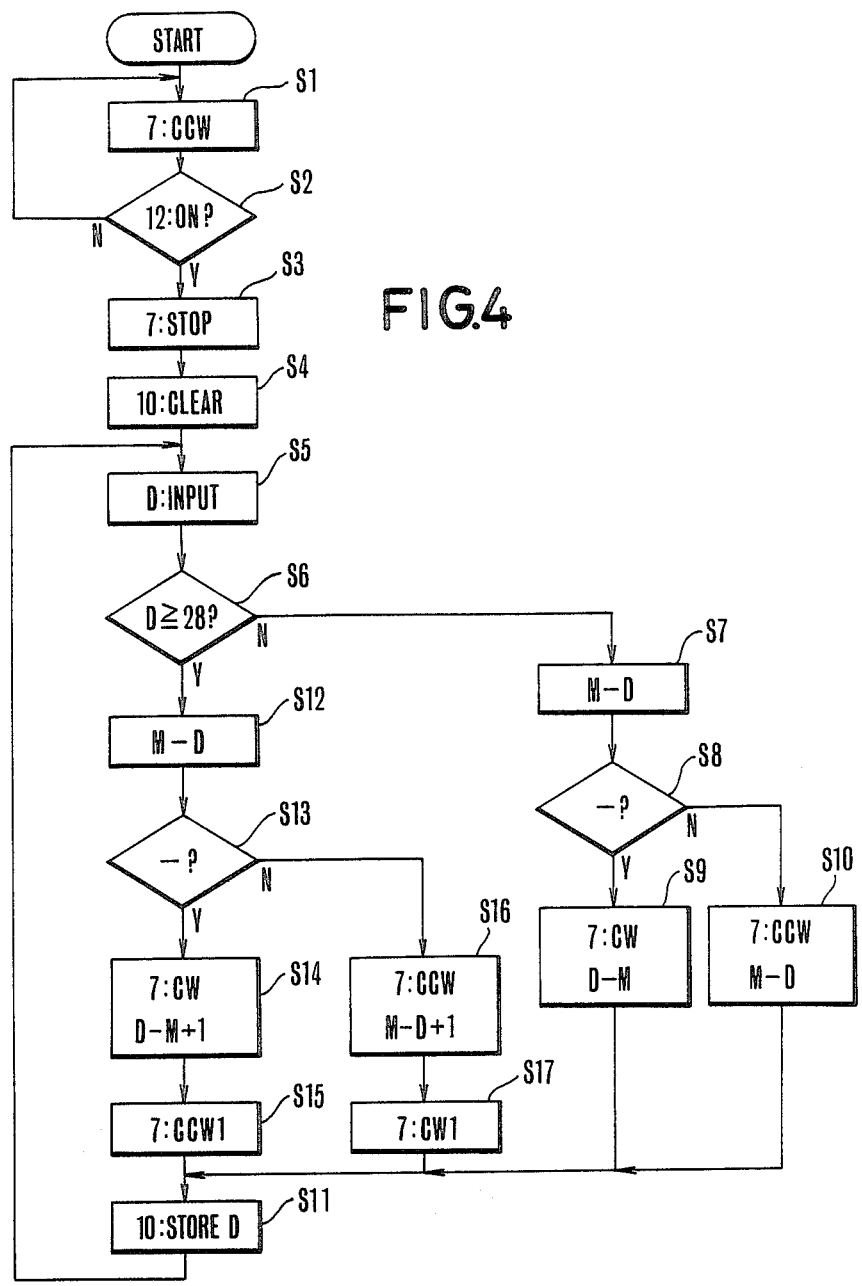
FIG. 4 is a flow chart illustrating the control flow of the control circuit of FIG. 3.

The manner in which the above-described control circuit 11 operates is explained by reference to the flow chart of FIG. 4. When an electrical power source is turned on, the control circuit 11 gives the drive circuit 13 a command of rotating the motor 7 to the counterclockwise direction (hereinafter referred to as "CCW" direction) as viewed in FIG. 1 (FIG. 4-S1), thereby the diaphragm is adjusted toward the full open aperture. This command is preserved until the maximum aperture response switch 12 turns on (FIG. 4-S2). As the aperture opening reaches the maximum diameter, when the switch 12 turns on, the control circuit 11 commands the stoppage of the motor 7 (FIG. 4-S3). Then, the control circuit 11 after having cleared the content of the memory 10 (FIG. 4-S4) takes in the output D of the decoder 9 (FIG. 4-S5), and examines whether or not this output D is equal to or larger than 28 representing the corresponding number of steps to F/16 (FIG. 4-S6). If the D is smaller than 28, or F/16, the control circuit 11 subtracts the D from the output M of the memory 10 (FIG. 4-S7), and examines whether or not the result is minus (FIG. 4-S8). If so, it commands the motor 7 to rotate "D-M" steps in the clockwise direction (hereinafter referred to as "CW" direction) (FIG. 4-S9). If not, the command is to rotate the motor 7 "M-D" steps in CCW direction (FIG. 4-S10). After that, in a step S11, the control circuit 11 causes the memory 10 to store the output of the decoder 9 which occurs at this time, and then returns to the step S5. A similar procedure to that described above then repeats itself. In such a manner, the adjustment to a region of F/1.4 to F/11 is controlled.

Meanwhile, if the D is determined in the step S6 to be not less than 28, or F/16, the control circuit 11, similarly to the steps S7 and S8, computes "M-D" (FIG. 4-S12) and examines whether or not the result is minus (FIG. 4-S13). If so, it commands the motor 7 to rotate "D-M+1" in the CW direction (FIG. 4-S14). The termination of this rotation is followed by a command of rotating one step for now in the CCW direction. If the result obtained in the step S13 is not minus, the control circuit 11 commands the motor 7 first to rotate "M−D+1" steps in the CCW direction (FIG. 4-S16) and then to rotate one step backward or in the CW direction. After that, the flow advances to the next step S11. A similar procedure to the above then repeats itself. In such a manner, the adjustment in the region of F/16 to F32 is controlled.

Though one embodiment of the invention is as such, it is to be understood that the excessive drive followed by the return drive should not be to a particular region of F/16 to F32, and this region may be altered properly depending on the mechanical tolerances the diaphragm device to which the invention is applied has. Also, the amount of excessive drive is not limited to one step. For the case of using n ($\geq 1$) drive steps for each stop of the diaphragm, any of the smaller numbers of steps than n may be adopted as desired. Also, for a particular structure of the diaphragm device, only one of the two drive modes described in connection with the lines (a) and (b) in FIG. 2 may be employed.

What is claimed is:

1. A diaphragm drive device comprising:
   (a) diaphragm means arranged in the path of a photographing light beam to establish any preselected target aperture value in a given range of aperture values;
   (b) drive means for driving said diaphragm means;
   (c) circuit means for providing an output signal indicative of a displacement value; and (d) control means operably responsive to said output signal of said circuit means for controlling the driving of said diaphragm means to establish the setting of said preselected target aperture value in such manner that after said diaphragm means has been driven by said drive means in a direction toward said target aperture value until beyond the target aperture value by a predetermined common measure, said diaphragm means is driven in the direction reverse to the aforesaid direction by said predetermined common measure.

2. A diaphragm drive device according to claim 1, wherein said diaphragm means includes a plurality of diaphragm blades arranged in said path.

3. A diaphragm drive device according to claim 1, wherein said drive means includes a stepping motor.

4. A diaphragm drive device according to claim 1, wherein said target aperture value lies in a region of said range of aperture values.

5. A diaphragm drive device according to claim 1, wherein said target aperture value lies in a comparatively closed-down region of said range of aperture values.

6. A diaphragm drive device according to claim 3, wherein said predetermined common measure is a preselected number of steps of said stepping motor.

7. A diaphragm drive device according to claim 6 wherein said stepping motor is drivable in plural steps to step said diaphragm means between successive of said aperture values and wherein said predetermined common measure is less than the number of said plural steps.

8. A diaphragm drive device comprising:

(a) diaphragm means for controlling the incident light amount;

(b) drive means for driving said diaphragm means; and (c) control means having first and second modes for controlling said drive means to set said diaphragm means at a target diaphragm value, whereby in the first mode, after said diaphragm means is driven in a direction toward the target aperture value until beyond the target aperture value, it is returned to the reversed direction to establish the setting of the target diaphragm value, and in the second mode, said diaphragm means is driven in a direction toward the target aperture value until the target aperture value to establish the setting of the target aperture value.

9. A diaphragm drive device according to claim 8, wherein said diaphragm means includes a plurality of diaphragm blades arranged in the photographing optical path to adjust the light amount.

10. A diaphragm drive device according to claim 8, wherein said drive means includes a stepping motor.

11. A diaphragm drive device according to claim 8, wherein said control means controls said drive means in the first mode for a prescribed first region of aperture values in a range of all aperture values said diaphragm means can take, and controls said drive means in the other or second region of aperture values.

12. A diaphragm drive device according to claim 11, wherein said first prescribed region has its aperture value of the state that said diaphragm means is closed down relative to said second region.

* * * * *